United States Patent [19]

Kurashige et al.

[11] Patent Number: 5,363,476
[45] Date of Patent: Nov. 8, 1994

[54] IMAGE CONVERTER FOR MAPPING A TWO-DIMENSIONAL IMAGE ONTO A THREE DIMENSIONAL CURVED SURFACE CREATED FROM TWO-DIMENSIONAL IMAGE DATA

[75] Inventors: Masufumi Kurashige, Tokyo; Shinichi Fukushima, Kanagawa, both of Japan

[73] Assignee: Sony Corporation, Tokyo, Japan

[21] Appl. No.: 9,812

[22] Filed: Jan. 27, 1993

[30] Foreign Application Priority Data

Jan. 28, 1992 [JP] Japan .................. 4-037020

[51] Int. Cl.⁵ .......................... G06F 15/62
[52] U.S. Cl. ...................... 395/125; 395/119; 395/120
[58] Field of Search ............. 395/119, 120, 125, 141, 395/155, 161

[56] References Cited

U.S. PATENT DOCUMENTS

| | | | |
|---|---|---|---|
| 4,791,581 | 12/1988 | Ohba | 395/125 |
| 4,829,456 | 5/1989 | Joonishi et al. | 395/119 |
| 4,831,445 | 5/1989 | Kawabe | 358/160 |
| 4,860,217 | 8/1989 | Sasaki et al. | 395/125 |
| 4,949,286 | 8/1990 | Ohba | 395/125 |
| 4,956,706 | 9/1990 | Ohba | 358/93 |
| 4,965,844 | 10/1990 | Oka et al. | 382/44 |
| 5,003,498 | 3/1991 | Ota et al. | 395/120 |
| 5,070,465 | 12/1991 | Kato et al. | 395/141 |

FOREIGN PATENT DOCUMENTS

0211345 7/1986 European Pat. Off. ..... G06F 15/72

*Primary Examiner*—Heather R. Herndon
*Assistant Examiner*—Almis Jankus
*Attorney, Agent, or Firm*—Limbach & Limbach; Philip M. Shaw, Jr.

[57] ABSTRACT

An image converter for mapping two dimensional image data onto a shape produced by a three-dimensional coordinate system includes an input circuit for inputting first shape data representing a top sectional shape of the shape and second shape data representing a side sectional shape of the shape, the first shape data and the second shape data being plural coordinate data in a two-dimensional coordinate system, a memory for storing the first shape data and the second shape data, a three-dimensional shape data producing generating circuit supplied with the first shape data and the second shape data read out from the memory for calculating three-dimensional shape data representing the shape, and a mapping processor supplied with the three-dimensional shape data and the two-dimensional image data for mapping the two-dimensional image data onto the shape and producing output data representing the shape on which the two-dimensional image is mapped.

3 Claims, 5 Drawing Sheets

IMAGE CONVERTER FOR MAPPING A TWO-DIMENSIONAL IMAGE ONTO A THREE DIMENSIONAL CURVED SURFACE CREATED FROM TWO-DIMENSIONAL IMAGE DATA

FIELD OF THE INVENTION

This invention relates to an image converter, and more particularly to an image converter for providing special effects to television signals.

BACKGROUND OF THE INVENTION

As such special effect system for providing special effects to television signals, there has been proposed one, for example, by U.S. Pat. No. 4,965,844, in which a television signal is processed to obtain a digital signal so as to display an image on a display, the image being seen just like an input image is pasted up (hereinafter referred to as "mapping") on a three-dimensional curved surface (for instance, cylindrical, like a wine glass, etc., hereinafter referred to as "shape").

In a method of this type of image conversion, the input image is divided into a plurality of blocks having a predetermined size, and image data of each block are stored progressively in predetermined addresses of a memory according to predetermined write address data.

At the same time, predetermined calculation is executed with respect to the address of the stored input image data prior to the conversion according to conversion input data input by the operator using separate input means, thus obtaining an address to read input image data stored in the memory.

The read address is calculated such that an output image just like an input image is mapped onto a predetermined shape assembled with a raster scan, and according to this read address image data in a block stored in predetermined address in the memory is read out. Thus, a two-dimensional plane output image, which appears just like the input image, is mapped onto a predetermined shape.

When actually mapping input image or video data $VD_{IN}$ shown in FIG. 1 into the shape of a wine glass, for instance, the operator inputs heights $y_0, y_1, \ldots$ in y-axis direction and corresponding radii $r_0, r_1, \ldots$, as shown in FIG. 2, as shape data representing the wine glass by assuming the y-axis as the center of rotation, thus setting side contour S1 of the shape.

By rotating the side contour S1 about the y-axis, an address $(x_n, y_n, z_n)$ of typical point P of the shape S, as shown in FIG. 3, is calculated as shown by following equations:

$$x_n = r_0 \cos\theta \quad (1)$$

$$y_n = y_0 \quad (2)$$

$$z_n = r_0 \sin\theta \quad (3)$$

In these equations, $\theta$ represents the angle with respect to the x-axis.

On the surface of the shape S thus calculated, pixels of each block of the input image $VD_{IN}$ are mapped as an inverse image, thus obtaining a two-dimensional plane output image $VD_{OUT0}$ which looks just like the input image $V_{IN}$, as shown in FIG. 4, mapped onto the surface of the shape S of the wine glass.

In the above image conversion method, however, the side contour S1 is set as the shape S and is rotated about the y-axis. In practice, therefore, it is possible to obtain only a rotor as the contour of the shape S, and it is impossible to meet an operator's demand of mapping the input image $VD_{IN}$ on various three-dimensional curved surfaces such as polygons. The method, therefore, is still inconvenient.

SUMMARY OF THE INVENTION

In view of the foregoing, an object of this invention is to provide an image converter which permits mapping of a two-dimensional input image onto three-dimensional shapes such as polygons with a simple procedure.

The foregoing objects and other objects of the invention have been achieved by the provision of an image converter for mapping two-dimensional image data onto a shape produced in a three-dimensional coordinate system. The image converter produces the three-dimensional shape data representing the shape on the basis of first shape data representing a top sectional view of the shape and second shape data representing a side sectional view of the shape, and the two-dimensional shape data is mapped onto the shape on the basis of the three-dimensional shape data.

The nature, principle and utility of the invention will become more apparent from the following detailed description when read in conjunction with the accompanying drawings in which like parts are designated by like reference numerals or characters.

DETAILED DESCRIPTION OF THE INVENTION

Figure 1:
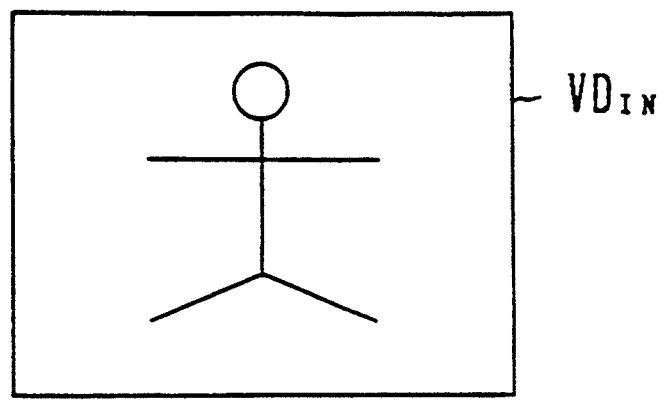
FIG. 1 is a schematic view showing an example of a two-dimensional input image.
Figure 2:
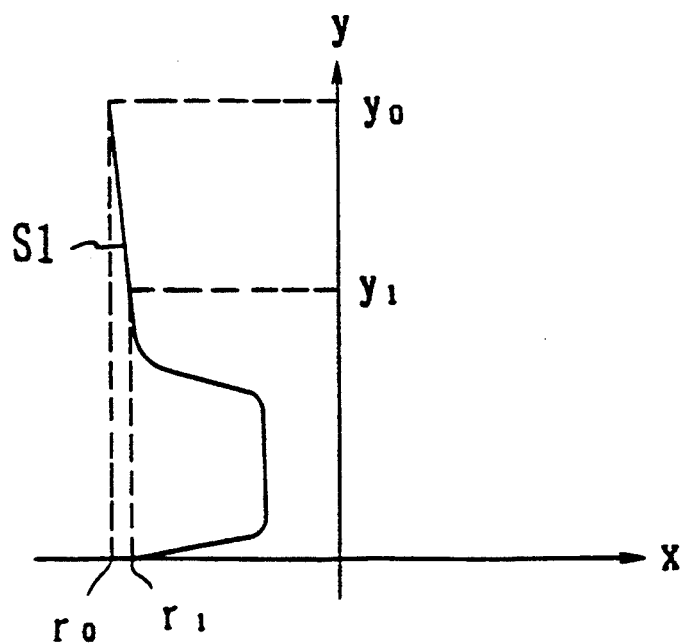
FIGS. 2 through 4 are schematic views for explanation of operation in conventional image converter.
Figure 3:
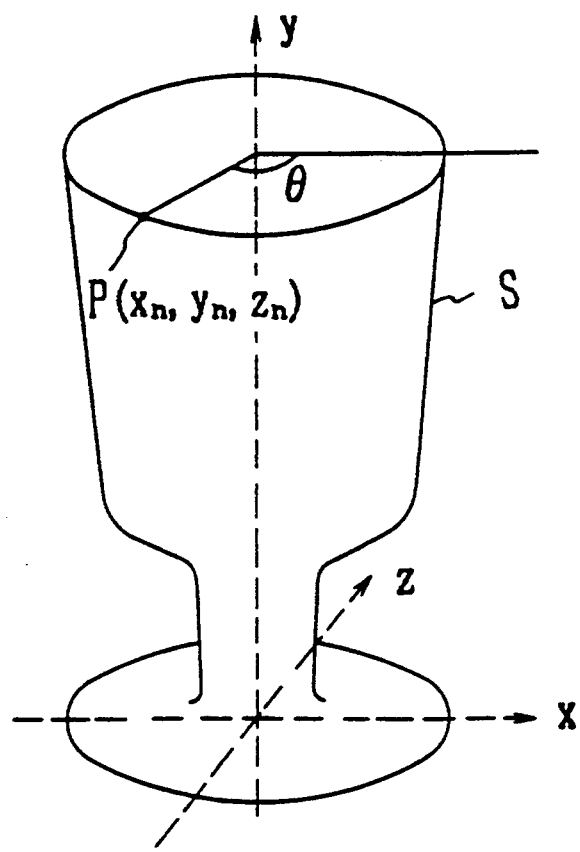
Figure 4:
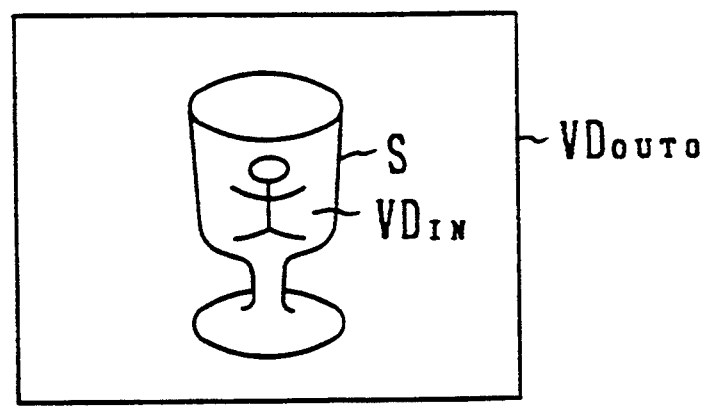
Figure 5:
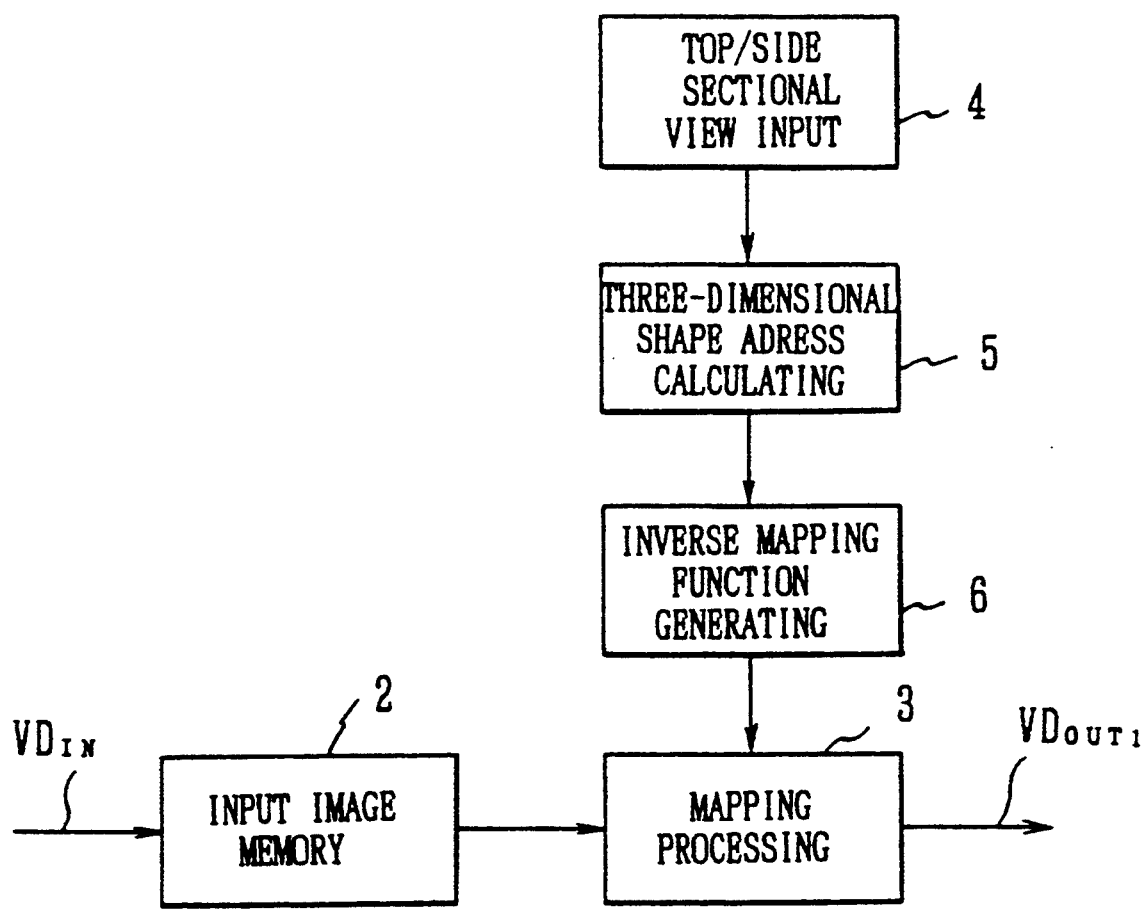
FIG. 5 is a block diagram showing the image converter according to an embodiment of the invention.

Preferred embodiments of this invention will be described with reference to the accompanying drawings:

A two-dimensional input image data $VD_{IN}$ to be converted as shown in FIG. 1, is stored once in an input image memory 2 of the image converter 1 shown in FIG. 5. The input image data $VD_{IN}$ stored in the input image memory 2 is read out and supplied to a mapping processing circuit 3 at a predetermined timing. The desired data representing a top and side sectional view of three-dimensional shape is also input through the top/side sectional view input unit 4. The operator operates an input means with a mouse or a like pointing device so that the data representing the top/side sectional view is produced from the mouse or the like pointing device.

Figure 6:
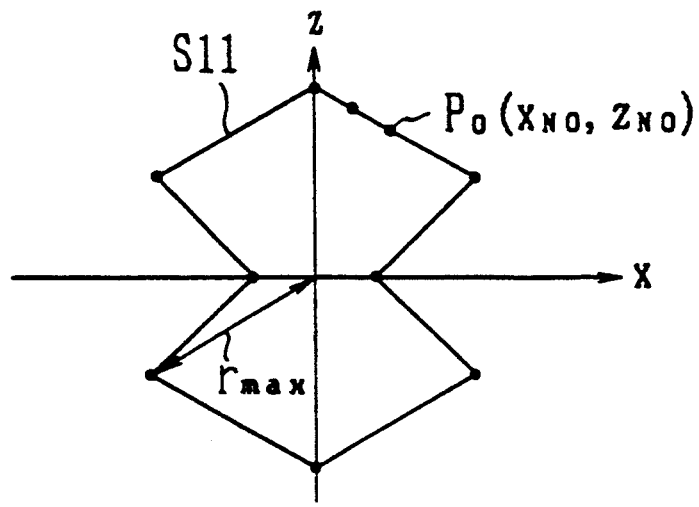
FIG. 6 is a schematic view for explanation of producing operation of the data representing a top sectional view in the image converter shown in FIG. 5.

Referring to FIG. 6, for example, the data representing top sectional view S11 is produced in X-z coordinate system with the mouse or the like pointing device. FIG. 6 shows only coordinates of representative point P0. Actually, coordinates of plural points on the outline of the top sectional view S11, however, are selected with the mouse or the like pointing device, and then the data representing these coordinates is stored in the memory of the three-dimensional shape address calculating circuit 5. In this operation, each coordinate value representing top sectional view S11 is normalized on the basis of a maximum distance from the center point to an outline of top sectional view, and is restored in the memory. Therefore, for example, the coordinates of representative point $P_0$ is indicated by the parameter $(x_{n0}/r_{max}, z_{n0}/r_{max})$.

Figure 7:
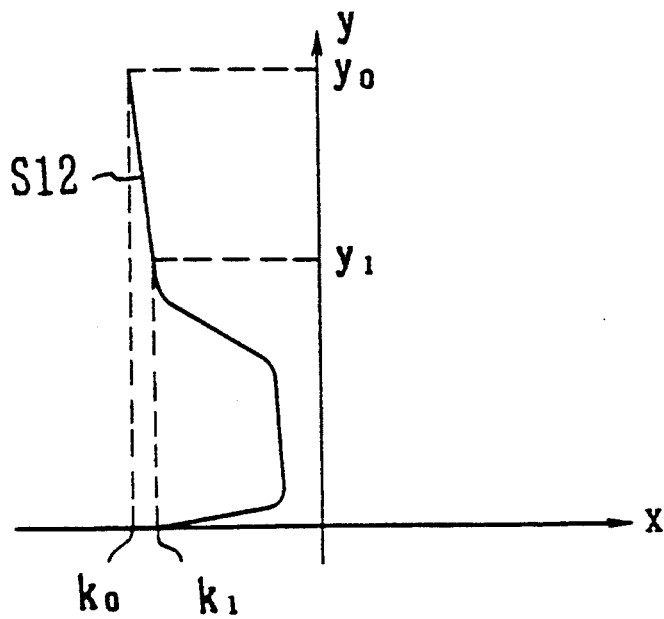
FIG. 7 is a schematic view for explanation of producing operation of the data representing a side sectional view in the image converter shown in FIG. 5.

Furthermore, the data representing the side sectional view S12 is produced in a x-y coordinate system with the mouse or the like pointing device as shown in FIG. 7. The data representing the side sectional view S12 is indicated by coordinate data $(k_0, y_0)$, $(k_1, y_1)$. FIG. 7 shows only two points. Actually, coordinates of plural points on the outline of the side sectional view S12, however, is selected with the mouse or the like pointing device, and then the data representing these coordinates is stored in the memory of the three-dimensional shape address calculating circuit 5.

Figure 8:
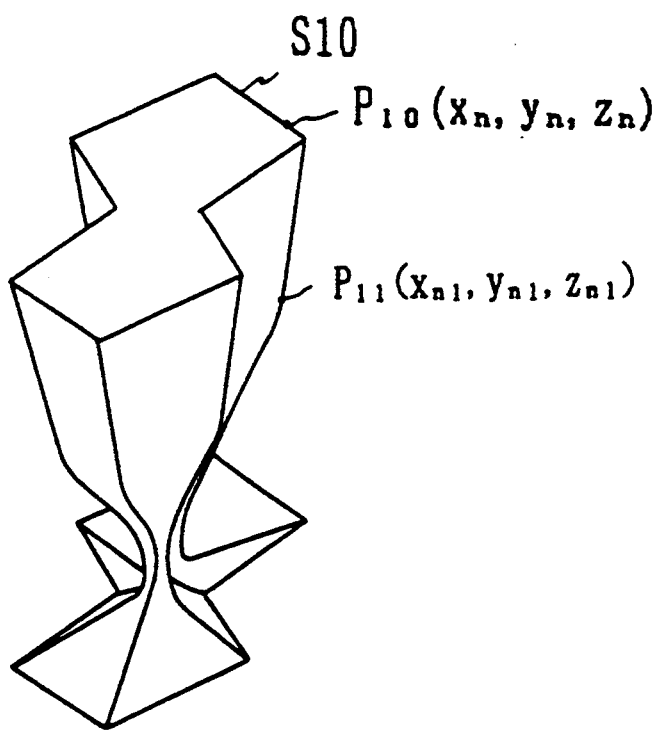
FIG. 8 is a schematic view for explanation of shape producing operation in the image converter shown in FIG. 5.

The shape address calculating circuit 5 calculates the coordinate data representing three-dimensional shape S10 as shown in FIG. 8 based on the data showing the top and side sectional view S11 and S12 stored in the memory. For example, the coordinates in a point $P_{10}$ $(x_n, y_n, z_n)$ on the shape S10 are represented by parameters given as following equations:

$$x_n = (x_{n0}/r_{max})*k_0 \quad (4)$$

$$y_n = y_0 \quad (5)$$

$$z_n = (z_{n0}/r_{max})*k_0 \quad (6)$$

and, the coordinates in a point $P_{11}$ $(x_{n1}, y_{n1}, z_{n1})$ are represented by parameters given as following equations:

$$x_{n1} = (x_{n0}/r_{max})*k_1 \quad (7)$$

$$y_{n1} = y_1 \quad (8)$$

$$z_{n1} = (z_{n0}/r_{max})*k_1 \quad (9)$$

The coordinates in plural points on the three-dimensional shape S10 are calculated by the same method so that the three-dimensional shape S10 is specified.

Each coordinate data representing the three-dimensional shape calculated by this method is supplied to an inverse mapping function generating circuit 6. Then an inverse mapping function is generated and the data is supplied to the mapping processing circuit 3.

Figure 9:
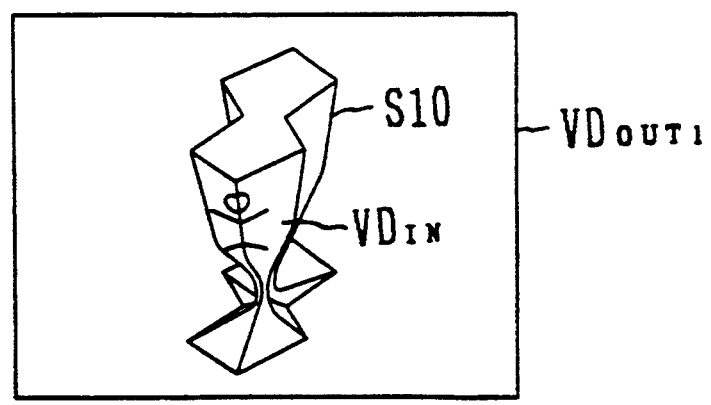
FIG. 9 is a schematic view for explanation of mapping operation in the image converter shown in FIG. 5.

Hence, in the mapping processing circuit 3, the input image $VD_{IN}$ input from an input image memory 2 is mapped in accordance with the inverse mapping function, and an output image $VD_{OUT1}$ is generated in a two-dimensional plane which seems to have the input image $VD_{IN}$ posted on the surface of shape S10 as shown in FIG. 9. Namely, in a mapping processing circuit 3, the two-dimensional image data is read out and output from each address position of the input image memory 2 in accordance with each address position on the shape S10 based on the inverse mapping function. Moreover, this mapping process is known as, for example, U.S. Pat. No. 5,070,465.

With the above construction, it is possible to realize the image converter 1, which permits the input image $VD_{IN}$ to be mapped onto various three-dimensional shapes with a simple procedure of forming the three-dimensional data S10 in accordance with the shape data representing side and top sectional views S12 and S11 of the input three-dimensional shape and then deforming the input image $VD_{IN}$ the position of each pixel of which is moved in accordance with the three-dimensional shape data S10.

In the above embodiment, an input image is mapped onto a three-dimensional shape like a wine glass having a polygonal sectional shape. However, the present invention is not only limited to this, but also is applicable to a case of designating the top and side sectional views as desired for mapping input image onto various three-dimensional shapes such as pyramids and polygons.

As has been described in the foregoing, according to the present invention it is possible to realize an image converter, which permits mapping an input image onto various three-dimensional shapes such as polygons with a simple procedure for forming three-dimensional shape data in accordance with a shape data representing the side and top sectional views of an input three-dimensional shape and changing for the input image the position of each pixel to be moved in accordance with the three-dimensional shape data.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An image converter for mapping two dimensional image data onto a shape produced by a three-dimensional coordinate system, comprising:

input means for inputting first shape data representing a top sectional shape of the shape and second shape data representing a side sectional shape of the shape, the first shape data and the second shape data being plural coordinate data in a two-dimensional coordinate system;

store means for storing the first shape data and the second shape data;

three-dimensional shape data producing means supplied with the first shape data and the second shape data read out from the store means for calculating three-dimensional shape data representing the shape; and mapping means supplied with the three-dimensional shape data and the two-dimensional image data for mapping the two-dimensional image data onto the shape and producing output data representing the shape on which the two-dimensional image is mapped, wherein the mapping means includes an input image memory for storing the two-dimensional image data;

inverse mapping function producing means supplied with the three-dimensional shape data for producing an inverse mapping function; and mapping processing means for reading output and outputting the two-dimensional image data from each address position of the input image memory in accordance with each address position on the shape using the inverse mapping function.

2. The image converter according the claim 1 wherein the input means is a mouse.

3. The image converter according to claim 1 wherein the input means is a pointing device.

* * * * *